United States Patent [19]
Kienke et al.

[11] Patent Number: 5,524,970
[45] Date of Patent: Jun. 11, 1996

[54] ROTARY RECLINER

[75] Inventors: Ingo Kienke, Reinscheid, Germany; Krishnan Kolady, Ann Arbor, Mich.; John C. Scalzo, Farmington Hills, Mich.; Gerald A. Zimmerlee, Brighton, Mich.; Ralf Hoge, Radevornwald, Germany

[73] Assignee: Hoover Universal, Inc., Plymouth, Mich.

[21] Appl. No.: 288,357

[22] Filed: Aug. 10, 1994

[51] Int. Cl.⁶ .................................................. B60N 2/02
[52] U.S. Cl. ........................................ 297/362; 297/365
[58] Field of Search ................................ 297/362, 364, 297/365

[56] References Cited

U.S. PATENT DOCUMENTS

| | | |
|---|---|---|
| 4,407,544 | 10/1983 | Bahring .................................. 297/362 |
| 4,453,767 | 6/1984 | Walk et al. . |
| 4,773,704 | 9/1988 | Engels . |
| 4,828,322 | 5/1989 | Walk et al. . |
| 4,832,405 | 5/1989 | Werner et al. . |
| 4,836,607 | 6/1989 | Kluting . |
| 4,874,204 | 10/1989 | Walk et al. . |
| 5,154,475 | 10/1992 | Kafitz . |
| 5,312,158 | 5/1994 | Wittig et al. . |

*Primary Examiner*—Peter R. Brown
*Assistant Examiner*—Anthony D. Barfield
*Attorney, Agent, or Firm*—Harness, Dickey & Pierce

[57] ABSTRACT

A rotary recliner for a vehicle seat having a pair of meshing gears rotating about a common pivot. Axially movable wedge segments are provided to bias an eccentric mounting one of the gears to force the gears into tight engagement with one another to eliminate free play and avoid rattling and vibration of the recliner. The two wedge segments are axially movable upon rotary motion of an operating cap to relieve the free play reduction and enable adjustment of the recliner. The wedge segments do not function as bearing surfaces of the recliner during recliner adjustment to avoid high friction forces which must be overcome to adjust the recliner.

12 Claims, 3 Drawing Sheets

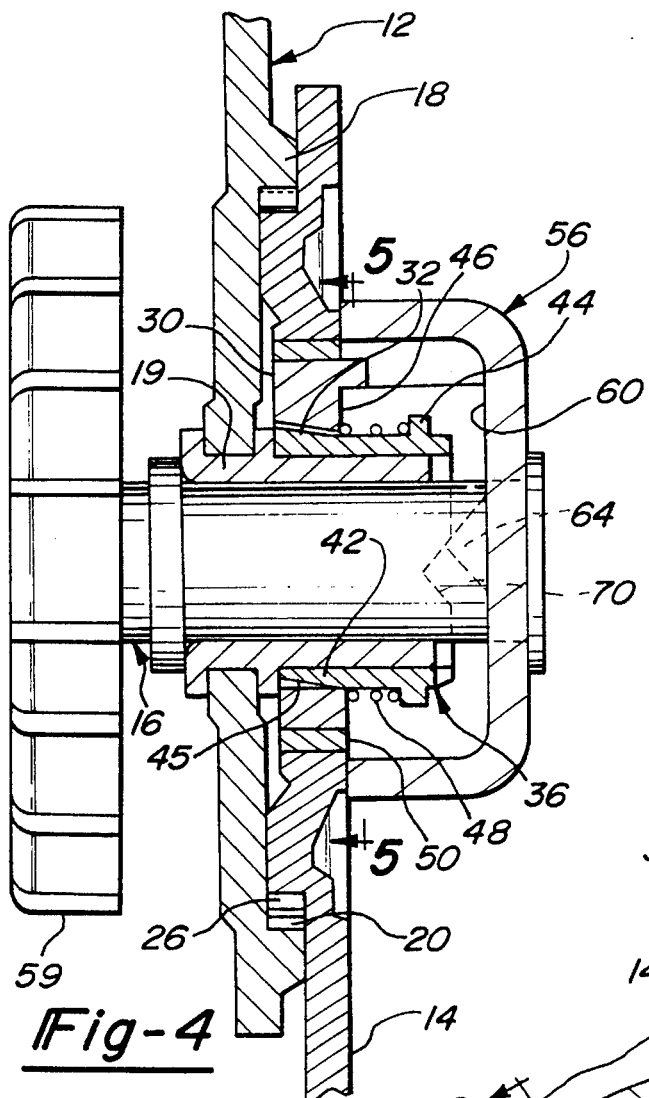
*Fig-4*
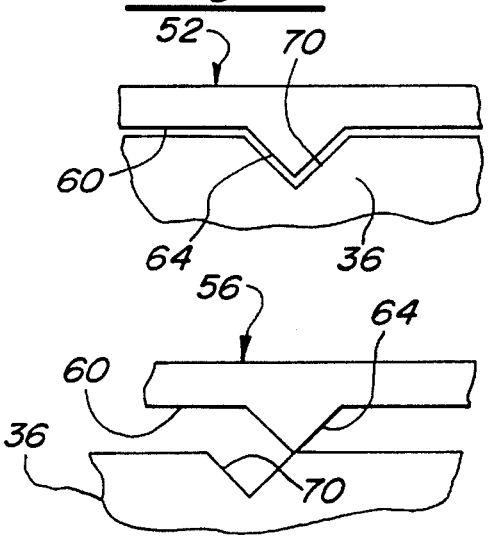
*Fig-6*
*Fig-7*
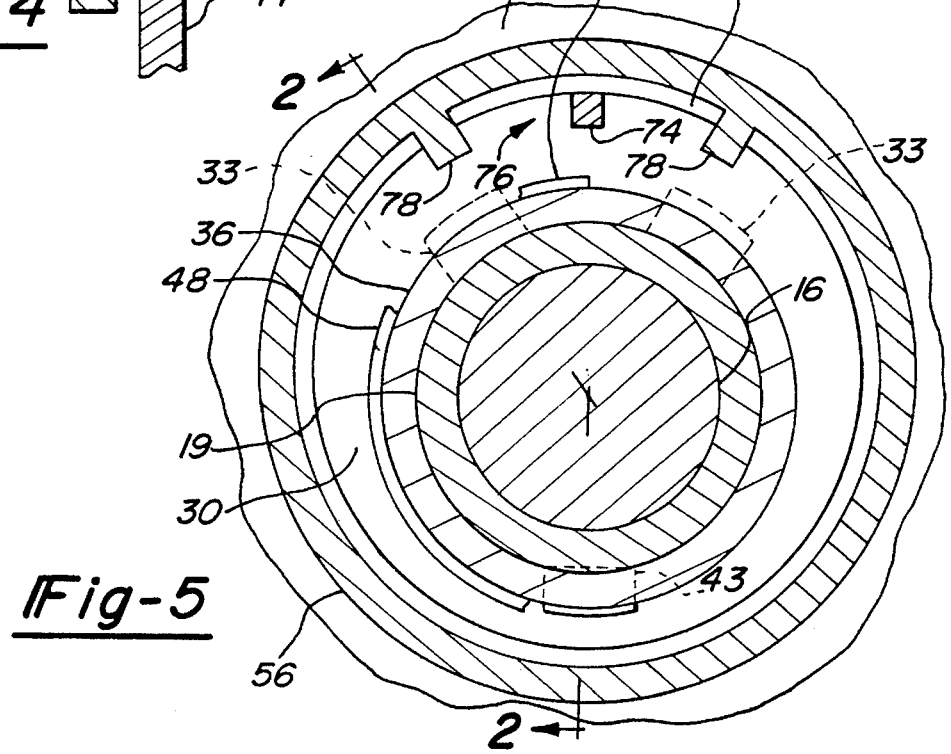
*Fig-5*

5,524,970

ROTARY RECLINER

BACKGROUND AND SUMMARY OF THE INVENTION

The present invention relates to a rotary recliner for mounting an adjustable seat back to a body supporting seat cushion and in particular to improvements in such a recliner which eliminate the free play between the recliner components when the recliner is not being adjusted.

Rotary recliners for adjustable vehicle seats which employ a pair of mating gears, an inner gear and an outer gear rotating about a common pivot, are well known. Such recliners have a first component attached to the body supporting seat cushion and a second component attached to the seat back. The two recliner components are coupled together for rotation relative to one another about a pivot shaft. One recliner component carries an inner spur gear, having outwardly extending teeth, while the other component carries an outer gear having inwardly directed teeth. The inner gear has at least one less tooth than the outer gear and has a diameter which is smaller than the diameter of the outer gear by at least the radial height of the outer gear teeth.

The inner gear is mounted on an eccentric so as to bias the inner gear in one direction radially relative to the outer gear. This results in meshing of gear teeth on one side and a clearance between the gear teeth on the opposite side. Rotation of the eccentric causes the area of teeth mesh to move circumferentially around the outer gear whereby the difference in the number of gear teeth produces rotation of the inner gear relative to the outer gear.

After adjustment of the seat back, the seat back is held in its adjusted position by the eccentric maintaining the meshing of the inner gear and outer teeth. The recliner is self locking in the sense that forces applied to the seat back can not cause a rotation of the eccentric and movement of the seat back. Only rotation of the eccentric by the operating handle produces a change in the seat back position. A certain amount of free play, i.e. clearance between the gear teeth is necessary for proper operation of the recliner. However, the free play also results in judder, jerking of the seat back during rearward adjustment as well as rattling and vibration of the seat back during vehicle operation on rough roads. Both the judder and the vibration are viewed as evidence of poor quality.

Various approaches have been taken to eliminate the free play from rotary recliners once they have been adjusted. One approach to eliminate free play is to use an axially moving cone which forces the teeth of the inner gear into firm engagement with the outer gear. An example of this is shown in U.S. Pat. No. 4,453,767. The eccentric is formed with a conical outer surface. The inner gear mounted on the eccentric has a complementary conical bore. The eccentric is biased axially by a spring to firmly engage the inclined conical surfaces. One disadvantage of this design is its high friction. The conical surfaces are also bearing surfaces with relative rotational motion as the eccentric is turned to adjust the recliner. The resulting force required to adjust the recliner is high. As a consequence, in a seat having dual recliners, only one recliner will have free play reduction to keep the adjustment efforts acceptable.

Another type of free play reduction is disclosed in U.S. Pat. No. 5,154,475. There a pair of circumferential wedge elements surround a rotary motion transmitting member and form the outer surface of the eccentric. A spring biases the two wedge elements in opposite directions in a generally sickle shaped clearance where the wedge elements tightly fit between the motion transmitting member and the gear. This design also has the disadvantage of high friction caused by engaged wedge surfaces at bearing surfaces with relative motion during recliner adjustment. With this design, one of the two wedge elements remain engaged during adjustment of the recliner, producing a high adjustment force which is substantially constant over the full range of seat back angles.

It is an object of the present invention to provide an improved recliner which is easy to construct, eliminates high friction bearing surfaces during adjustment and which has high strength to resist loads during a vehicle collision.

The recliner of the present invention utilizes a pair of circumferentially spaced, axial movable, wedge segments having an inclined surface which mates with an inclined surface of the eccentric. The wedge segments force the inner gear into tight engagement with the outer gear. The wedge segments are axially movable upon rotary motion of the operating cap. During adjustment, to the free play reduction is first released (i.e. the wedge segments are moved axially) and then the recliner is adjusted by rotation of the eccentric. Since the free play reduction is released before the recliner is adjusted, the adjustment efforts are approximately the same as for a rotary recliner without free play reduction. The lower adjustment efforts are achieved by separating the inclined wedge surfaces from the load bearing surfaces with relative motion during adjustment. The torque required to first release the wedge segments is less than the adjustment torque so that the wedge segments are first released before the recliner is adjusted.

The two wedge segments are circumferentially spaced apart from one another with one wedge segment to each side of the point of maximum eccentricity of the eccentric. The wedge segments are disposed in cutout sections in the eccentric. The optimum location for the wedge segments is 45° to each side of the maximum eccentricity. It is at these two locations that the radial forces of the seat back load act on the eccentric. By placing the wedge segments at these two locations, the radial free play reduction forces are aligned with the seat back load on the eccentric. However, since this is the location of the seat back forces on the eccentric, it is desirable to locate the cutout sections of eccentric elsewhere in order to maintain the thickness of the eccentric and maximize its strength. As a result, in the preferred embodiment, the wedge segments are spaced only 70° apart, 35° to each side of maximum eccentricity. This location produces the desired free play reduction while maintaining the strength of the eccentric.

Further objects, features and advantages of the invention will become apparent from a consideration of the following description and the appended claims when taken in connection with the accompanying drawings.

BRIEF DESCRIPTION OF THE DRAWINGS

FIG. 4 is a sectional view of the recliner as seen from substantially the line 2—2 of FIG. 5 showing the free play reduction wedge segments disengaged from the eccentric to introduce the free play for adjustment of the recliner;

FIG. 5 is a sectional view of the recliner as seen from substantially the line 5—5 of FIG. 4;

FIG. 6 is a fragmentary view of the cap and wedge carrier illustrating a cam for moving the wedge carrier showing the wedge carrier with the wedge segments engaged; and FIG. 7 is a view similar to FIG. 6 showing the wedge carrier with the wedge segments disengaged.

DETAILED DESCRIPTION OF THE PREFERRED EMBODIMENT

Figure 1:
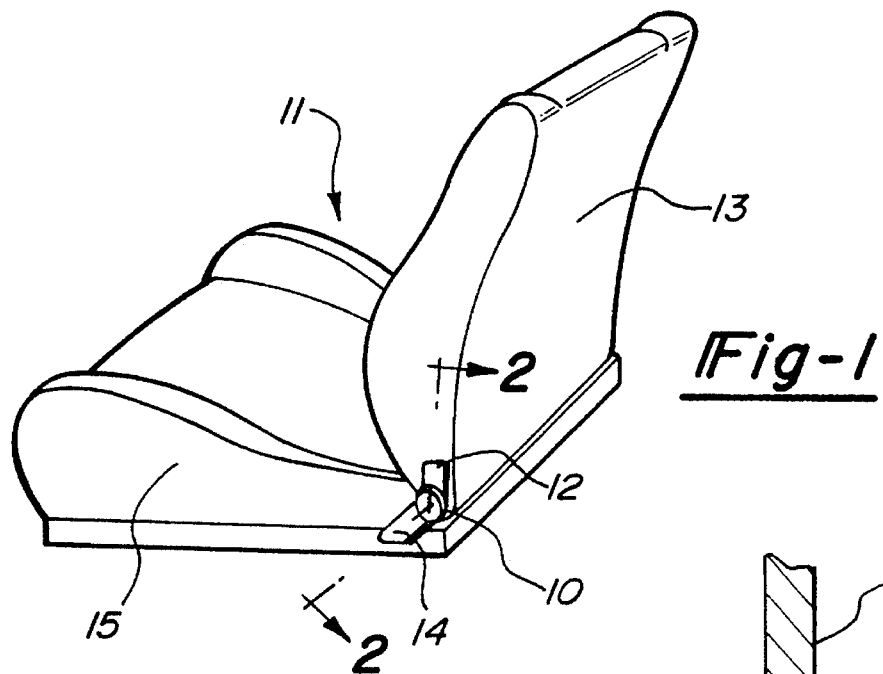
FIG. 1 is an elevational view of a seat having the recliner of the present invention.

The recliner of the present invention is designated at 10 and shown in FIG. 1 on the seat 11. Recliner 10 includes a first recliner component 12, and a second recliner component 14. The first component 12 is adapted to be attached to the seat back 13 of a vehicle seat while the second component 14 is adapted to be attached to the seat cushion 15. The recliner components are pivotally connected to one another about a pivot bolt 16.

The first recliner component 12 includes an offset portion 18 concentric about the bolt axis 17 and is formed with a plurality of inwardly extending teeth 20, forming an outer gear 22. The second recliner component 14 has an offset portion 24 which is formed with a plurality of outwardly extending teeth 26, forming an inner spur gear 28. The inner spur gear 28, as mentioned previously, is of a smaller diameter than the outer gear 22 and has at least one less tooth than the outer gear. The diameter of the inner gear is less than the diameter of the outer gear by at least the radial height of the teeth 20 of the outer gear.

Figure 2:
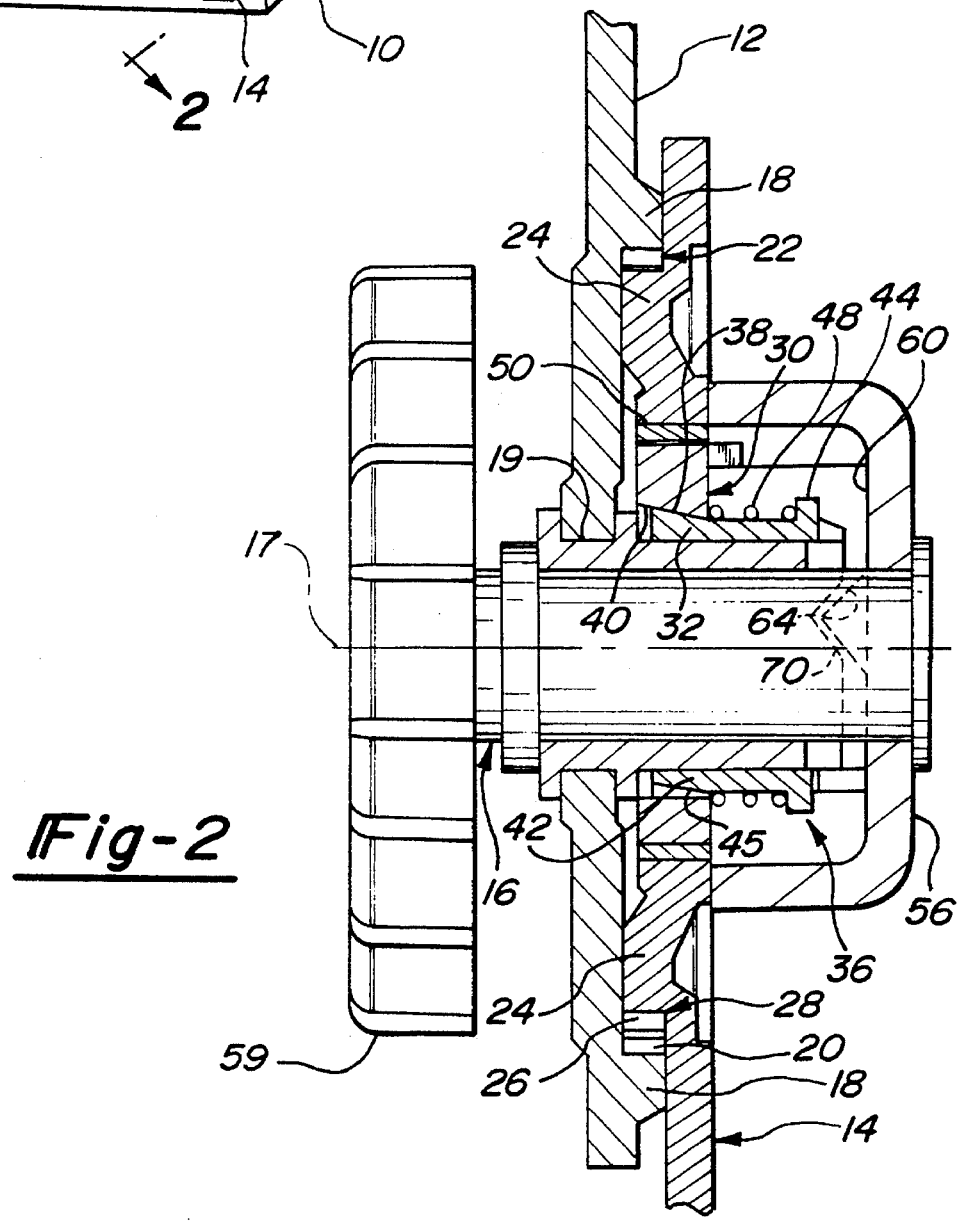
FIG. 2 is a sectional view of the recliner of the present invention as seen from substantial the line 2—2 of FIG. 5 showing the free play reduction wedge segments engaged with the eccentric to eliminate free play.
Figure 3:
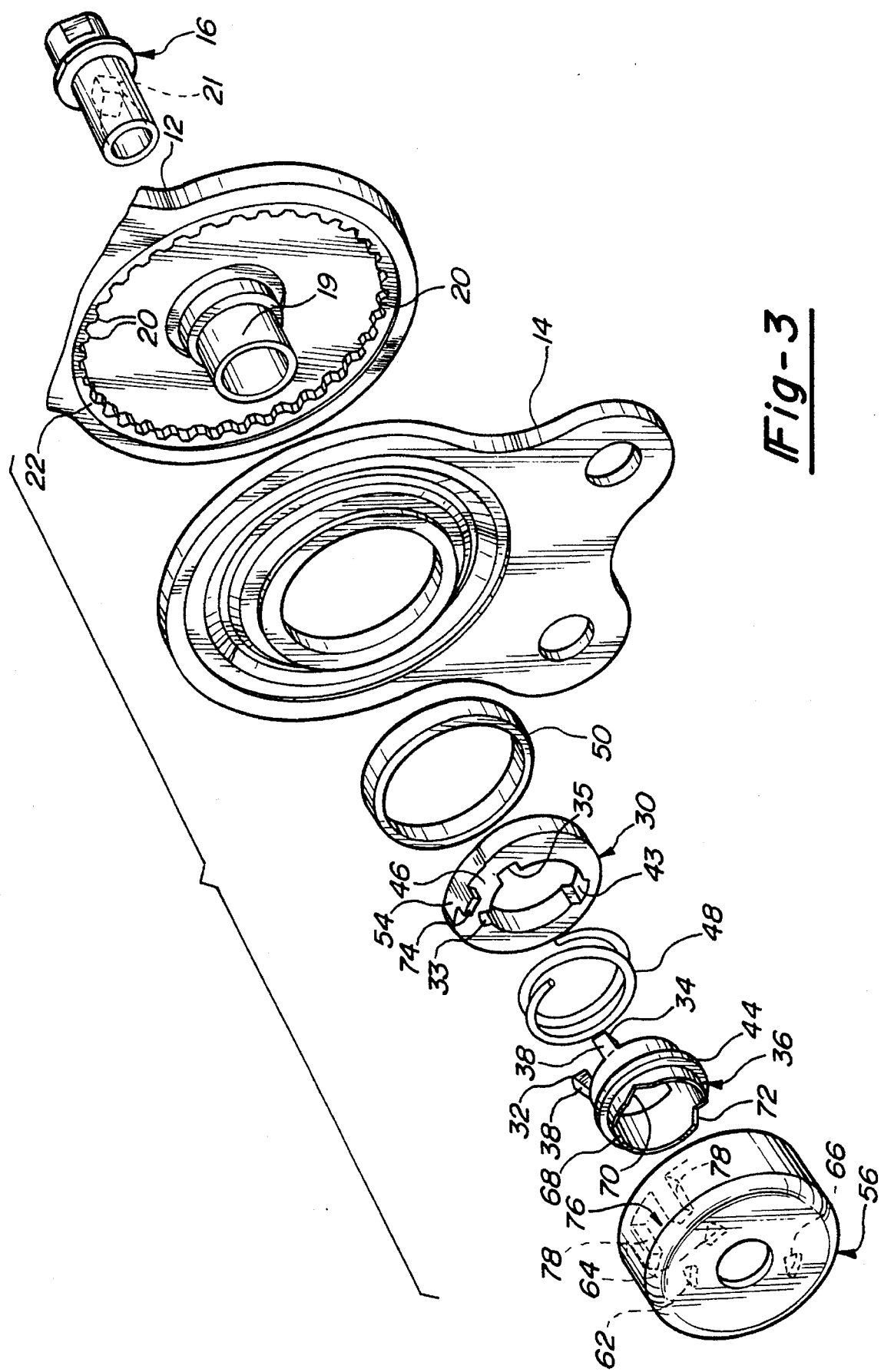
FIG. 3 is an exploded perspective view of the recliner of the present invention.

A cylindrical bushing 19 is welded, riveted, or otherwise attached to the first recliner component 12. The bolt 16 passes through the bushing 19. The second component 14 is placed adjacent the first component 12 with the gear teeth in mesh on one side of the outer gear, resulting in an eccentricity of the inner gear relative to axis 17 of the bolt 16. An eccentric 30 is rotatably mounted on the bushing 19 to hold the inner gear in mesh with the outer gear. With the inner gear eccentric to the axis 17 of the bolt 16, the teeth of the inner gear mesh with the teeth of the outer gear on one side, the top as shown in FIG. 2 while a clearance exists between the teeth on the opposite side, the bottom as shown in FIG. 2. Upon rotation of the eccentric, the location of the gear teeth mesh will rotate about the outer gear. As a result of the difference in the number of teeth between the inner and outer gears, the movement of the teeth mesh will produce a rotation of the inner gear relative to the outer gear, thus adjusting the relative rotational positions of the recliner components 12, 14.

To ensure adjustability of the recliner, it is necessary for a slight amount of free play to exist between the inner and outer gear teeth. This free play, however, is undesirable once the recliner has been adjusted. The free play enables rattling and vibration of the seat back. The present invention utilizes a pair of circumferentially spaced wedge segments 32, 34 which bias the inner gear into firm engagement with the outer gear when the recliner is not being adjusted to eliminate this free play. In the preferred embodiment, the wedge segments 32, 34 are fingers which extend axially from an annular wedge carrier 36 mounted on the bolt 16. The wedge segments 32, 34 extend axially from the annular wedge carrier 36 into cutout sections 33, 35, in the eccentric. The wedge segments each have an inclined radially outer surface 38 which engages with complementary inclined surfaces 40 of cutout sections 33, 35 in the eccentric 30. The wedge segments flare radially outward as the wedge segments extend axially from the wedge carrier. As a result, the wedge segments are radially thickest at their distal ends. The wedge carrier 36 also includes a third finger 42 which functions to align the wedge carrier within a third cutout section 43 in the eccentric, generally radially opposite from the two wedge segments.

The wedge carrier includes an outwardly extending annular rib 44 which is axially spaced from one face 46 of the eccentric. A coil compression spring 48 surrounds the wedge carrier and is positioned between the annular rib 44 and the eccentric face 46. The spring 48 urges the wedge carrier away from the eccentric, in the direction of tighter engagement of the wedge segments 32, 34 with the eccentric 30. The wedge carrier, eccentric and spring are assembled together before being placed on bushing 19. The outer surface 45 of the alignment finger 42 is tapered toward its distal end to allow the thicker distal ends of the wedge segments to pass through the narrower ends of the cutout sections 33, 35 of the eccentric. The eccentric, the wedge segment length and wedge angle are chosen so that once the eccentric, spring and wedge carrier preassembly are placed on the bushing 19 and the wedge carrier is confined to remain axially aligned with the bushing, the wedge segments can not pass through the eccentric cutout sections. Once the inner gear is placed on the eccentric, the radial movement of the eccentric is limited. This further ensures that the wedge segments can not be withdrawn from the eccentric. The spring 48 thus serves to maintain the wedge segments engaged with the eccentric to eliminate free play.

While the wedge segments increase in thickness toward their distal ends in the disclosed embodiment, it is also possible to have the wedge segments taper toward the distal ends. In such a case, a spring would be used to bias the wedge carrier toward the eccentric instead of away from the eccentric to engage the inclined wedge surfaces. The release for the free play reduction must also be rearranged so the release force works against the spring force.

Press fit within the bore of the second recliner component 14 is a bushing 50 having a low friction PTFE coating. This bushing helps to prevent judder during rearward seat back adjustment by providing a low and constant friction coefficient regardless of the load on the seat back.

The wedge segments 32, 34 are spaced up to 90° apart circumferentially from one another. The location of the wedge segments is chosen to produce the desired free play reduction and to also produce a strong recliner. In the shown embodiment, the centers of the wedge segments are spaced approximately 70° apart, 35° to each side of the point of maximum eccentricity.

The forces acting radially on the eccentric are approximately 90° apart, 45° to each side of maximum eccentricity. To ensure contact between the inner gear and the eccentric at approximately the same two locations, the eccentric is formed with a slightly flattened portion 54 over an arc of approximately 60° at the location of maximum eccentricity.

During adjustment of the recliner, the wedge segments 32, 34 are first moved axially to free the wedge segments from the eccentric. This reintroduces the free play into the recliner, allowing adjustment with low efforts similar to the efforts needed for a rotary recliner without free play reduction. Adjustment is accomplished by further rotating the operating cap 56 which is mounted to the pivot bolt 16 by riveting the bolt to the cap, or by other fastening means, so that the cap turns with the bolt. A hand wheel 59 is attached to the bolt 16 to rotate the bolt and the cap 56. The inner surface 60 of the cap is provided with three triangular shaped projecting cams 62, 64, 66. These cams are each spaced circumferentially so as to be located at the two wedge segments 32, 34 and the alignment finger 42 of the wedge carrier 36. Likewise, the wedge carrier has three triangular shaped recesses 68, 70, 72 into which the projecting cams of the operating cap are disposed. Upon rotation of the operating cap 56, the projecting cams 62, 64, 66 engage the recesses 68, 70, 72 of the wedge carrier on the inclined surfaces, thus imparting an axial force onto the wedge carrier. The axial force causes the wedge carrier to move axially toward the eccentric, in opposition to the spring 48, releasing the wedge segments from engagement with the eccentric inclined surfaces, thereby introducing the free play into the recliner and allowing adjustment. Three cams are used so that one is placed at each wedge segment and one on the opposite side to balance the forces on the wedge carrier. Theoretically, any number of cams and recesses could be used.

Once the wedge segments are fully released, the eccentric is rotated by the axial projection 74 on the face 46 of the eccentric. The projection 74 is disposed within a slot 76 formed between ribs 78 inside cap 56. The ribs 78 and projection 74 are spaced apart to allow the wedge carrier to be moved axially first to release the wedge segments before the eccentric is rotated. Generally speaking, the wedge segments will be released first, before the eccentric is rotated. However, in instances where the load on the recliner is low, the torque needed to rotate the eccentric may be less than the torque needed to release the free play reduction wedge segments. In such a case, the wedge segments will rotate the eccentric before the wedge segments are completely released and before the ribs 78 of the cap contact the projection 74 on the eccentric.

Once the rotating torque on the bolt 16 is released, the spring 48 returns the wedge carrier and wedge segments back into engagement with the eccentric, thereby eliminating free play and preventing vibration and rattling of the seat back 13. The free play reduction wedge carrier is self locking in the sense that seat back loads acting on the recliner can not force the wedge segments out of engagement. The self locking feature of the wedge segments is separate from the self locking feature inherent in the rotary recliner planetary gear system. Another advantage of separating the free play reduction surfaces from recliner bearing surfaces with relative movement during adjustment is that the wedge angle can be selected to ensure self locking of the free play reduction without affecting the function or self locking or strength of the recliner.

One advantage of the recliner of the present invention is the axial displacement of the wedge segments upon pure rotary motion of the operating cap. This completely eliminates any friction forces during adjustment caused by the free play reduction wedge segments. As a result, recliner adjustment efforts are similar to recliners without free play reduction. This enables two recliners to be used, one on each side of the seat 11, both with free play reduction. A single hand wheel is used with the two recliners coupled by a torsion bar (not shown). The ends of the bar are inserted into sockets 21 formed in the bolts 16 of each recliner.

Another advantage of the recliner is that the inclined wedge surfaces only move axially relative to the eccentric and are not bearing surfaces carrying a radial seat back load during recliner adjustment. The load on the seat back is not carried through the wedge surfaces and therefore does not affect the adjustment efforts.

It is to be understood that the invention is not limited to the exact construction illustrated and described above, but that various changes and modifications may be made without departing from the spirit and scope of the invention as defined in the following claims.

We claim:

1. A recliner mechanism for changing the position of a seat back rest relative to a body supporting seat cushion, said recliner comprising:

a first component connectable to one of said seat cushion and said seat back, said first component having an outer gear with inwardly directed teeth and a sleeve concentric with said outer gear defining a pivot axis;

a second component connectable to the other of said seat cushion and said seat back, said second component having an inner gear with outwardly directed teeth, said inner gear having a smaller diameter than said outer gear and said second component having a bore concentric with said inner gear;

an eccentric provided on said sleeve and positioned between said sleeve and said bore of said second component to mount said second component on said sleeve with said inner gear being eccentric to said sleeve whereby said inner gear is offset from said axis to mesh the teeth of said inner gear with the teeth of said outer gear on one side of said outer gear, said inner and outer gear teeth having a certain amount of free play therebetween, said eccentric having inner and outer cylindrical surfaces, one of said cylindrical surfaces having a cutout keyway section having a circumferentially extending surface which is inclined to said axis;

a wedge segment disposed in said cutout keyway section and having an inclined surface mating with said inclined surface of said cutout keyway section of said eccentric, said wedge segment being movable axially between positions engaged with and disengaged from said inclined surface of said cutout keyway section, said wedge segment when in said engaged position urging said inner gear radially in one direction into firm engagement with said outer gear to eliminate free play between said inner and outer gears;

bias means for biasing said wedge segment into said engaged position; and rotary adjustment means including a rotating member engageable with said wedge segment and said eccentric for selectively moving said wedge segment axially to said disengaged position and for rotating said eccentric upon rotation of said rotating member, rotation of said eccentric resulting in the point of engagement between said gear teeth moving around said outer gear whereby said second recliner component is moved rotationally relative to said first recliner component to change the relative positions of said back rest and said body supporting seat cushion.

2. The recliner mechanism of claim 1 wherein said eccentric has a pair of said cutout keyway sections circumferentially spaced from one another, said cutout keyway sections each having a circumferentially extending surface inclined to said axis and further comprising a pair of said wedge segments with one wedge segment disposed in each of said cutout keyway sections.

3. The recliner mechanism of claim 2, wherein said wedge segments are circumferentially spaced apart equidistantly on each side of the point of maximum eccentricity of said eccentric.

4. The recliner of claim 3 wherein said wedge segments are circumferentially spaced apart approximately 70 degrees to 90 degrees.

5. The recliner mechanism of claim 2 wherein said circumferentially spaced apart wedge segments are integrally formed as axially extending portions of an annular wedge carrier surrounding said sleeve adjacent to said eccentric and rotatable about said sleeve.

6. The recliner of claim 5 further comprising cam means associated with said rotary member and said wedge carrier for moving said wedge carrier axially upon rotation of said rotary member and means associated with said rotary member and said eccentric for rotating said eccentric upon rotation of said rotary member.

7. The recliner of claim 6 wherein upon rotation of said rotary member, said cam means first moves said wedge carrier axially to disengage said wedge segments from said eccentric before rotating said eccentric.

8. The recliner mechanism of claim 1 wherein said cutout keyway section is formed in said inner cylindrical surface of said eccentric and said wedge segment is disposed between said sleeve and said eccentric to bias said eccentric radially from said sleeve in one direction whereby said inner gear is urged radially into firm engagement with said outer gear.

9. The recliner mechanism of claim 1 further comprising a pivot bolt extending through said sleeve and which is rotatable relative to said sleeve.

10. A recliner mechanism for changing the position of a seat back rest relative to a body supporting seat cushion, said recliner comprising:

a first component connectable to one of said seat cushion and said seat back, said first component having an outer gear with inwardly directed teeth and a sleeve concentric with said outer gear defining a pivot axis;

a second component connectable to the other of said seat cushion and said seat back, said second component having an inner gear with outwardly directed teeth, said inner gear having a smaller diameter than said outer gear and said second component having a bore concentric with said inner gear;

an eccentric provided on said sleeve and positioned between said sleeve and said bore of said second component to mount said second component on said sleeve with said inner gear being eccentric to said sleeve whereby said inner gear is offset from said axis to mesh the teeth of said inner gear with the teeth of said outer gear on one side of said outer gear, said inner and outer gear teeth having a certain amount of free play therebetween, said eccentric having a bore with an inner cylindrical surface engaging said sleeve, said inner cylindrical surface having a pair of circumferentially spaced cutout keyway sections each having a circumferentially extending surface which is inclined to said axis;

an annular wedge carrier surrounding said sleeve adjacent said eccentric having a pair of axially extending portions which are disposed in said cutout keyway sections of said eccentric forming wedge segments, said wedge segments each having an inclined surface mating with said inclined surfaces of said cutout keyway sections of said eccentric, said wedge carrier being movable axially between positions in which said wedge segments are engaged with and disengaged from said inclined surfaces of said cutout keyway sections, said wedge segment when in said engaged position urging said eccentric radially toward said one direction whereby said inner gear is radially biased in said one direction into firm engagement with said outer gear to eliminate free play between said inner and outer gears;

bias means for biasing said wedge carrier into said engaged position of said wedge segments;

a rotating member adjacent to said wedge carrier and rotatable about said axis;

said rotating member and said wedge carrier including means for engaging said rotating member and said wedge carrier with one another upon rotation of said rotating member for moving said wedge carrier axially to said disengaged position; and said rotating member and said eccentric including means for engaging one another upon rotation of said rotating member for rotating said eccentric following disengagement of said wedge segments from said eccentric, rotation of said eccentric resulting in movement of the point of engagement between said inner and outer gear teeth around said outer gear whereby said second recliner component is moved rotationally relative to said first recliner component to change the relative positions of the back rest and said body supporting seat cushion.

11. The recliner mechanism of claim 10 further comprising a pivot bolt extending through said sleeve with said rotating member carried by said pivot bolt at one end and a hand knob attached to said pivot bolt at a second end and being rotatable about said axis to turn said pivot bolt and said rotating member.

12. The recliner mechanism of claim 10 wherein said means for engaging said rotating member and said wedge carrier includes a cam and follower.

* * * * *